United States Patent
Yakumaru et al.

(10) Patent No.: US 7,191,543 B2
(45) Date of Patent: Mar. 20, 2007

(54) DRYING DEVICE AND METHOD OF OPERATION THEREFOR

(75) Inventors: Yuuichi Yakumaru, Osaka (JP); Tomoichiro Tamura, Kyoto (JP); Fumitoshi Nishiwaki, Hyogo (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 10/515,331

(22) PCT Filed: Mar. 31, 2004

(86) PCT No.: PCT/JP2004/004688

§ 371 (c)(1),
(2), (4) Date: Dec. 1, 2004

(87) PCT Pub. No.: WO2004/090431

PCT Pub. Date: Oct. 21, 2004

(65) Prior Publication Data

US 2005/0217133 A1  Oct. 6, 2005

(30) Foreign Application Priority Data

Apr. 2, 2003 (JP) ............................. 2003-099240

(51) Int. Cl.
*F26B 21/06* (2006.01)

(52) U.S. Cl. .......................................... 34/77; 62/238.6

(58) Field of Classification Search .................... 34/74, 34/77, 380, 381; 62/238.6
See application file for complete search history.

(56) References Cited

U.S. PATENT DOCUMENTS

| | | | | | |
|---|---|---|---|---|---|
| 3,673,698 | A | * | 7/1972 | Guerard | 34/284 |
| 4,196,526 | A | * | 4/1980 | Berti | 34/77 |
| RE31,633 | E | * | 7/1984 | Lewis | 34/381 |
| 4,532,720 | A | * | 8/1985 | Uchida | 34/471 |
| 5,181,387 | A | * | 1/1993 | Meckler | 62/59 |
| 2003/0208923 | A1 | * | 11/2003 | Lewis | 34/471 |

FOREIGN PATENT DOCUMENTS

JP  2001-198396  7/2001

* cited by examiner

*Primary Examiner*—S. Gravini
(74) *Attorney, Agent, or Firm*—Armstrong, Kratz, Quintos, Hanson & Brooks, LLP

(57) ABSTRACT

A drying apparatus comprising a heat pump apparatus in which a refrigerant circulates through a compressor, a radiator, a throttle apparatus and an evaporator in this order, in which air heated by the radiator is introduced into a dry chamber, the air coming out from the dry chamber is cooled by a cooling apparatus, the air cooled by the cooling apparatus is dehumidified by the evaporator, and the air dehumidified by the evaporator is again heated by the radiator, wherein the drying apparatus further comprises compressor input detecting means for detecting input of the compressor, and cooling quantity control means for controlling a cooling quantity of the cooling apparatus using a value detected by the compressor input detecting means.

16 Claims, 7 Drawing Sheets

DRYING DEVICE AND METHOD OF OPERATION THEREFOR

TECHNICAL FILED

The present invention relates to a drying apparatus having a heat pump apparatus in which a refrigerant circulates through a compressor, a radiator, a throttle apparatus and an evaporator in this order, wherein air heated by the radiator is introduced into a dry chamber, the air coming out from the dry chamber is cooled by a cooling apparatus, and the air cooled by the cooling apparatus is dehumidified by the evaporator, and the air dehumidified by the evaporator is again heated by the radiator. The invention also relates to an operating method of the drying apparatus.

BACKGROUND OF THE INVENTION

An electric clothing dryer used in ordinary households uses an electric heater as a heat source which is necessary for drying. Due to the current carrying capacity of a domestic convenience receptacle, its amount of heat is limited, and this causes a bottleneck in reduction of time required for drying clothing. Further, heat used for drying clothing is not reused and is only discharged out, and this is waste of energy.

There is proposed a clothing dryer in which a heat pump is used as a heat source for drying clothing, a portion of drying air is discharged out from a body of the apparatus, thereby reducing the required electricity and achieving high dehumidification efficiency (e.g., see Japanese Patent Application Laid-open No.H7-178289 (pages 4 to 5, FIG. 1)). FIG. 12 shows a conventional clothing drying apparatus described in patent document 1.

In this drying apparatus, a rotation drum 22 is a dry chamber which is rotatably provided in a body 21 of the drying apparatus and which dries clothing 39 in the dry chamber. A rotation drum 22 is driven by a motor 27 through a drum belt 35. A blower 23 sends drying air from the rotation drum 22 toward a circulation duct 26 through a filter 24 and a rotation drum-side air intake 25. The blower 23 is driven by the motor 27 through a fan belt 28.

An evaporator 29 is disposed in the circulation duct 26. The evaporator 29 evaporates a refrigerant, thereby cooling and dehumidifying the drying air. A condenser 30 condenses a refrigerant, thereby heating the drying air flowing in the circulation duct 26. The heated drying air is introduced into the circulation duct 26 and is again returned to the dry chamber. The compressor 31 generates a pressure difference in a refrigerant. A throttle apparatus 32 comprising a capillary tube and the like maintains the pressure difference of the refrigerant. The evaporator 29, the condenser 30, the compressor 31 and the throttle apparatus 32 are connected to one another through pipes 33 to constitute a heat pump apparatus.

However, when the clothing is to be dried using such a drying apparatus, since the temperature of the drying air, a heat exchange loss between the body and outside, a moisture amount included in the clothing to be dried are gradually varied with drying time, it is necessary to always control the optimal amount of heat to be discharged outside. If heat which is greater than the optimal amount of heat to be discharged is discharged outside, the drying time is increased, and the electricity consumption amount is increased.

If the amount of heat of the drying air is excessively increased, pressure in a refrigeration cycle of the heat pump apparatus adversely rises, and there is a problem that the stable operation can not be carried out in the refrigeration cycle.

It is an object of the present invention to provide a drying apparatus which can be operated stably in a refrigeration cycle by cooling the drying air to avoid an influence on the refrigeration cycle caused by increase in the amount of heat of the drying air, and to provide an operating method of the drying apparatus.

It is another object of the invention to provide a drying apparatus capable of shortening the drying time of a subject to be dried, and to provide an operating method of the drying apparatus.

It is another object of the invention to provide a drying apparatus having high reliability and an operating method of the drying apparatus.

SUMMARY OF THE INVENTION

A drying apparatus according to a first aspect of the present invention comprises a heat pump apparatus in which a refrigerant circulates through a compressor, a radiator, a throttle apparatus and an evaporator in this order, in which air heated by the radiator is introduced into a dry chamber, the air coming out from the dry chamber is cooled by a cooling apparatus, the air cooled by the cooling apparatus is dehumidified by the evaporator, and the air dehumidified by the evaporator is again heated by the radiator. The drying apparatus further comprises compressor input detecting means for detecting input of the compressor, and cooling quantity control means for controlling a cooling quantity of the cooling apparatus using a value detected by the compressor input detecting means.

According to this aspect, drying air can be cooled in accordance with the input of the compressor, an amount of heat corresponding to the compressor input can be discharged outside, and the pressure in the refrigeration cycle can be maintained at predetermined pressure.

According to a second aspect of the invention, in the drying apparatus of the first aspect, the apparatus further comprises outlet air temperature detecting means for detecting outlet air temperature of the radiator, and refrigeration cycle control means for controlling compressing performance of the compressor using a value detected by the outlet air temperature detecting means.

According to this aspect, the compressor is controlled in accordance with the outlet air temperature of the radiator. With this, if the increase in radiator outlet temperature, i.e., the rising speed of the dry air temperature is quickened immediately after the operation is started for example, and if the refrigerant temperature in the evaporator is lowered, the amount of moisture to be dehumidified can be increased, and the drying time can be shortened.

According to a third aspect of the invention, in the drying apparatus of the second aspect, the refrigeration cycle control means controls throttle degree of the throttle apparatus using a value detected by the outlet air temperature detecting means.

According to this aspect, as the outlet air temperature is increased for example, the compression ratio of the refrigeration cycle is reduced. Thus, the input into the compressor can be reduced and energy can be saved.

According to a fourth aspect of the invention, in the drying apparatus of the first aspect, the drying apparatus further comprises discharge pressure detecting means for detecting discharge pressure of the compressor, and refrigeration cycle control means for controlling compressing performance of the compressor using a value detected by the discharge pressure detecting means.

According to this aspect, the discharged refrigerant pressure in the compressor is detected and the compressor is controlled. With this, the discharge pressure can be adjusted swiftly, the reliability of the compressor and the drying apparatus can reliably be ensured, and the drying air temperature especially immediately after the drying operation is started can swiftly be increased.

According to a fifth aspect of the invention, in the drying apparatus of the fourth aspect, the refrigeration cycle control means controls the throttle degree of the throttle apparatus using a value detected by the discharge pressure detecting means.

According to this aspect, the discharge pressure can further swiftly be adjusted by controlling the throttle apparatus. With this, the discharge pressure can be adjusted swiftly, the reliability of the compressor and the drying apparatus can reliably be ensured, and the drying air temperature especially immediately after the drying operation is started can swiftly be increased.

According to a sixth aspect of the invention, in the drying apparatus of the first aspect, the drying apparatus further comprises evaporator temperature detecting means for detecting refrigerant temperature of the evaporator, inlet air temperature detecting means for detecting inlet air temperature of the evaporator, inlet air humidity detecting means for detecting inlet air humidity of the evaporator, and refrigeration cycle control means for controlling compressing performance of the compressor based on dew point temperature determined by a value detected by the inlet air temperature detecting means and a value detected by the inlet air humidity detecting means.

According to this aspect, the refrigerant temperature, the inlet air temperature and the inlet air humidity of the evaporator are detected, and the compressor is controlled. With this, the dehumidification in the evaporator can reliably be carried out, and frost can be prevented from being formed and thus, the drying operation can be carried out within shorter time, and the drying apparatus can reliably be operated efficiently.

According to a seventh aspect of the invention, in the drying apparatus of the sixth aspect, the refrigeration cycle control means controls the throttle degree of the throttle apparatus based on dew point temperature determined by a value detected by the inlet air temperature detecting means and a value detected by the inlet air humidity detecting means.

According to this aspect, the refrigerant temperature, the inlet air temperature and the inlet air humidity of the evaporator are detected, and the throttle apparatus is controlled. With this, the dehumidification in the evaporator can reliably be carried out, and frost can be prevented from being formed and thus, the drying operation can be carried out within shorter time, and the drying apparatus can reliably be operated efficiently.

An eight aspect of the present invention provides operating method of a drying apparatus comprising a heat pump apparatus in which a refrigerant circulates through a compressor, a radiator, a throttle apparatus and an evaporator in this order, in which air heated by the radiator is introduced into a dry chamber, the air coming out from the dry chamber is cooled by a cooling apparatus, the air cooled by the cooling apparatus is dehumidified by the evaporator, and the air dehumidified by the evaporator is again heated by the radiator, wherein if input of the compressor is increased, cooling quantity of the cooling apparatus is allowed to be increased, and if the input of the compressor is reduced, the cooling quantity of the cooling apparatus is allowed to be reduced.

According to this aspect, drying air can be cooled in accordance with the input of the compressor, an amount of heat corresponding to the compressor input can be discharged outside, and the pressure in the refrigeration cycle can be maintained at predetermined pressure.

A ninth aspect of the invention provides an operating method of a drying apparatus comprising a heat pump apparatus in which a refrigerant circulates through a compressor, a radiator, a throttle apparatus and an evaporator in this order, in which air heated by the radiator is introduced into a dry chamber, the air coming out from the dry chamber is cooled by a cooling apparatus, the air cooled by the cooling apparatus is dehumidified by the evaporator, and the air dehumidified by the evaporator is again heated by the radiator, wherein if outlet air temperature of the radiator exceeds predetermined temperature, compressing performance of the compressor is allowed to be reduced, and if the outlet air temperature of the radiator becomes equal to or smaller than the predetermined temperature, the compressing performance of the compressor is allowed to be increased.

According to this aspect, the compressor is controlled in accordance with the outlet air temperature of the radiator. With this, if the increase in radiator outlet temperature, i.e., the rising speed of the dry air temperature is quickened immediately after the operation is started for example, and if the refrigerant temperature in the evaporator is lowered, the amount of moisture to be dehumidified can be increased, and the drying time can be shortened.

According to a tenth aspect of the invention, in the operating method of the drying apparatus of the ninth aspect, if the outlet air temperature of the radiator exceeds the predetermined temperature, throttle degree of the throttle apparatus is allowed to be increased, and if the outlet air temperature of the radiator becomes equal to or smaller than the predetermined temperature, the throttle degree of the throttle apparatus is allowed to be reduced.

According to this aspect, the throttle apparatus is controlled in accordance with the outlet air temperature of the radiator. With this, if the increase in radiator outlet temperature, i.e., the rising speed of the dry air temperature is quickened immediately after the operation is started for example, and if the refrigerant temperature in the evaporator is lowered, the amount of moisture to be dehumidified can be increased, and the drying time can be shortened. Further, as the outlet air temperature is increased, the compression ratio of the refrigeration cycle is reduced. Thus, the input into the compressor can be reduced and energy can be saved.

An eleventh aspect of the invention provides an operating method of a drying apparatus comprising: a heat pump apparatus in which a refrigerant circulates through a compressor, a radiator, a throttle apparatus and an evaporator in this order; evaporator temperature detecting means for detecting refrigerant temperature of the evaporator; inlet air temperature detecting means for detecting inlet air temperature of the evaporator; and inlet air humidity detecting means for detecting inlet air humidity of the evaporator; in which air heated by the radiator is introduced into a dry chamber, the air coming out from the dry chamber is cooled by a cooling apparatus, the air cooled by the cooling apparatus is dehumidified by the evaporator, and the air dehumidified by the evaporator is again heated by the radiator, wherein dew point temperature is calculated using a value detected by the inlet air temperature detecting means and a value detected by the inlet air humidity detecting means, the calculated dew point temperature and refrigerant temperature detected by the evaporator temperature detecting means are compared with each other, and if the detected refrigerant temperature is higher than the dew point temperature, compressing performance of the compressor is allowed to be increased, and if the detected refrigerant temperature is lower than a predetermined temperature, the compressing performance of the compressor is allowed to be reduced.

According to this aspect, the refrigerant temperature, the inlet air temperature and the inlet air humidity of the evaporator are detected, and the compressor is controlled. With this, the dehumidification in the evaporator can reliably be carried out, and frost can be prevented from being formed and thus, the drying operation can be carried out within shorter time, and the drying apparatus can reliably be operated efficiently.

According to a twelfth aspect of the invention, in the operating method of the drying apparatus of the eleventh aspect, if the detected refrigerant temperature is higher than the dew point temperature, the throttle degree of the throttle apparatus is allowed to be reduced, and if the detected refrigerant temperature is lower than a predetermined temperature, the throttle degree of the throttle apparatus is allowed to be increased.

According to this aspect, the refrigerant temperature, the inlet air temperature and the inlet air humidity of the evaporator are detected, and the throttle apparatus is controlled. With this, the dehumidification in the evaporator can reliably be carried out, and frost can be prevented from being formed and thus, the drying operation can be carried out within shorter time, and the drying apparatus can reliably be operated efficiently.

According to a thirteenth aspect of the invention, in the operating method of the drying apparatus of any one of the eight to twelfth aspects, if discharge pressure of the compressor exceeds predetermined pressure, the compressing performance of the compressor is allowed to be reduced.

According to this aspect, the discharge pressure can be adjusted swiftly, the reliability of the compressor and the drying apparatus can reliably be ensured, and the drying air temperature especially immediately after the drying operation is started can swiftly be increased.

According to a fourteenth aspect of the invention, in the operating method of the drying apparatus of the thirteenth aspect, if the discharge pressure of the compressor exceeds a predetermined pressure, the throttle degree of the throttle apparatus is allowed to be increased.

According to this aspect, the discharge pressure can be adjusted swiftly, the reliability of the compressor and the drying apparatus can reliably be ensured, and the drying air temperature especially immediately after the drying operation is started can swiftly be increased.

According to a fifteenth aspect of the invention, in the drying apparatus of any one of first to seventh aspects, carbon dioxide is used as the refrigerant, and the drying apparatus is operated in a state in which high pressure side pressure exceeds critical pressure.

According to this aspect, if the inlet side temperature of the refrigerant in the radiator is the same, higher outlet air temperature can be obtained as compared with flon refrigerant, and the drying time can be shortened.

According to a sixteenth aspect of the invention, in the operating method of the drying apparatus of any one of the eighth to twelfth aspects, carbon dioxide is used as the refrigerant, and the drying apparatus is operated in a state in which high pressure side pressure exceeds critical pressure.

According to this aspect, if the inlet side temperature of the refrigerant in the radiator is the same, higher outlet air temperature can be obtained as compared with flon refrigerant, and the drying time can be shortened.

DETAILED DESCRIPTION

Embodiments of a drying apparatus of the present invention will be explained below with reference to the drawings.

(First Embodiment)

Figure 1:
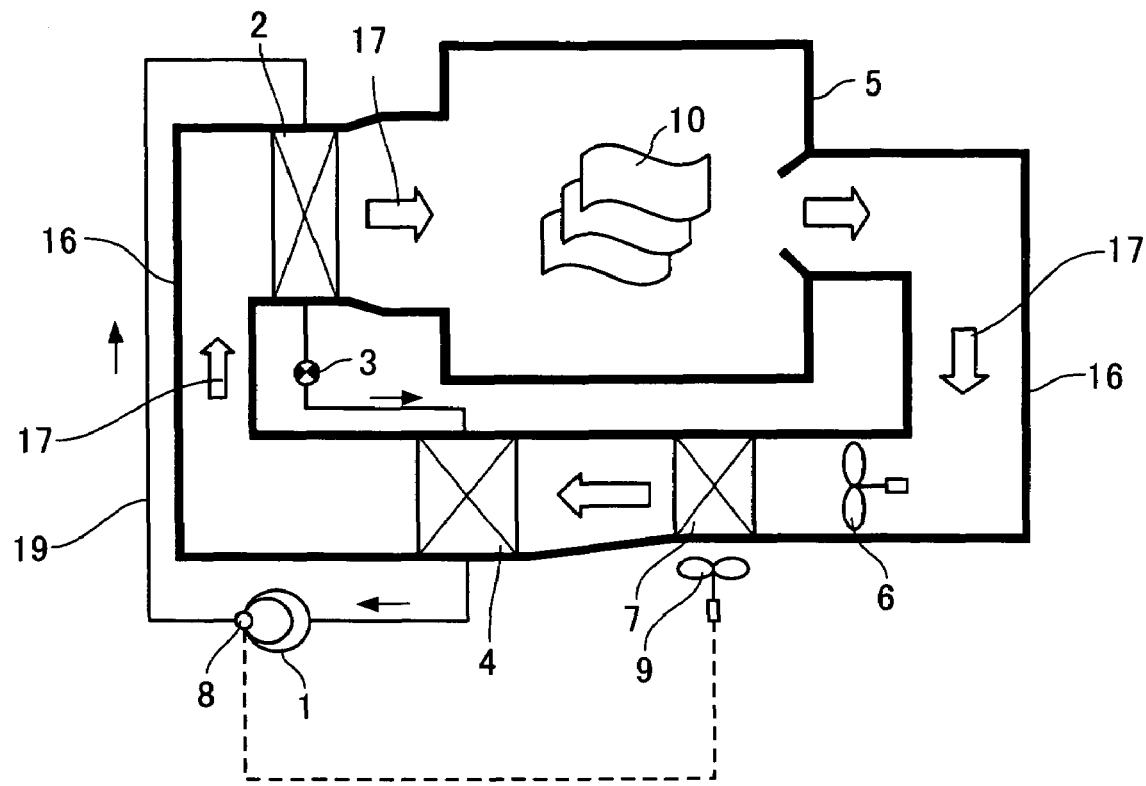
FIG. 1 is a block diagram of a drying apparatus of a first embodiment of the present invention.

FIG. 1 is a block diagram of a drying apparatus of a first embodiment of the present invention. The drying apparatus of this embodiment uses a refrigerant of flon, carbon dioxide or the like as working fluid, and has a heat pump apparatus. In the heat pump apparatus, a compressor 1, a radiator 2, a throttle apparatus 3 and an evaporator 4 are connected to one another through pipes 19. The drying apparatus includes a dry chamber 5 which dries a subject to be dried 10 such as clothing by drying air 17 heated by the radiator 2, a blower 6 for sending the drying air 17, and a cooling apparatus 7 for cooling the drying air 17. The drying air 17 circulates through the radiator 2, the dry chamber 5, the cooling apparatus 7 and the evaporator 4 via a duct 16. The drying apparatus includes compressor input detecting means 8 for detecting input of the compressor 1, and cooling quantity control means 9 for controlling the cooling quantity of the cooling apparatus 7 based on the detected input of the compressor.

The operation of the drying apparatus will be explained below.

First, a subject to be dried 10 is put into the dry chamber 5. If the blower 6 is rotated, a flow of the drying air 17 is generated. The drying air 17 is heated by the radiator 2 and enters the dry chamber 5, and absorbs moisture from the subject to be dried 10 in the dry chamber 5 and thus, the drying air 17 becomes humid and then, the drying air 17 is sent to the cooling apparatus 7 by the blower 6 and is cooled, and sent to the evaporator 4. The drying air sent to the evaporator 4 is dehumidified and sent to the radiator 2, and is again heated by the radiator 2 and sent to the dry chamber 5. Through this drying cycle, the subject to be dried 10 is dried.

Here, in the refrigeration cycle in the heat pump apparatus, an amount of heat radiated to the drying air 17 by the radiator 2 becomes greater than an amount of heat absorbed from the drying air 17 in the evaporator 4 by an amount of heat corresponding to the input of the compressor 1. Therefore, if the circulation of the drying air is continued, the amount of heat of the entire drying air is increased, the amount of heat of the refrigerant in the heat pump apparatus is increased, the pressure of the refrigerant is increased and exceeds the motor torque of the compressor 1 soon. Thus, in order to safely operate the heat pump apparatus, it is necessary to discharge the amount of heat of drying air by the cooling apparatus 7.

The operation of the cooling quantity control means 9 of the cooling apparatus 7 will be explained with reference to FIG. 2.

Figure 2:
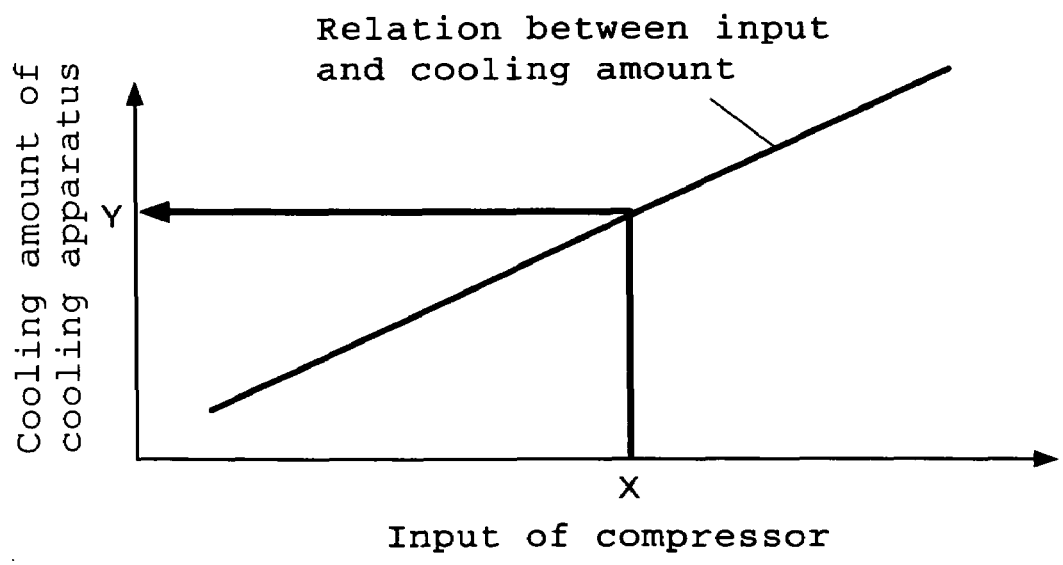
FIG. 2 shows a relation between input of a compressor and a cooling quantity of a cooling apparatus according to the first embodiment.

FIG. 2 shows a relation between the input of the compressor 1 and a cooling fan air volume set value (e.g., voltage of fan) of the cooling apparatus 7 for radiating heat outside. That is, if input X of the compressor 1 is detected by the compressor input detecting means 8, it can be determined that the cooling fan air volume set value for discharging out the amount of heat corresponding to the input is Y. Therefore, if control is exercised such that a cooling quantity set value of the cooling apparatus 7 becomes Y based on the relation shown in FIG. 2, an amount of heat corresponding to the input of the compressor 1 can be discharged out, and the pressure in the refrigeration cycle can be maintained at a predetermined pressure.

By detecting the input of the compressor 1 and controlling the cooling quantity of the cooling apparatus 7 in this manner, it is possible to always adjust the amount of heat to be discharged out. Therefore, it is possible to shorten the drying time to save energy while stably carrying out the refrigeration cycle operation from the beginning of the operation.

(Second Embodiment)

Figure 3:
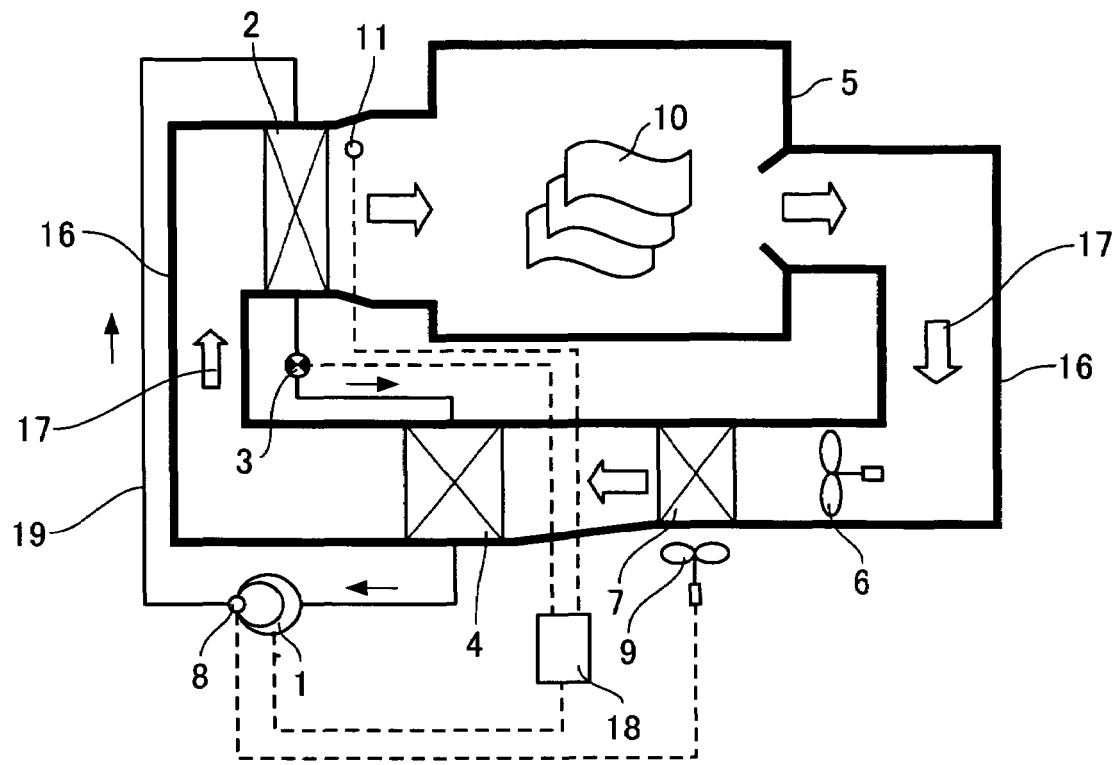
FIG. 3 is a block diagram of a drying apparatus of a second embodiment of the invention.

FIG. 3 is a block diagram showing a drying apparatus of a second embodiment of the invention. Only difference of the structure of the drying apparatus of the second embodiment from those of the first embodiment will be explained. The same can be applied to third and subsequent embodiments also.

The drying apparatus of the second embodiment includes, in addition to the structure of the first embodiment, outlet air temperature detecting means 11 for detecting the outlet air temperature of the radiator 2, and refrigeration cycle control means 18 for controlling compressing performance of the compressor 1 and the throttle degree of the throttle apparatus 3 based on the outlet air temperature.

The outlet air temperature detecting means 11 comprises a temperature sensor for example, and detects the temperature of the drying air 17 at the outlet of the radiator 2. The refrigeration cycle control means 18 comprises means for adjusting operating frequency of an electric motor which drives the compressor and controlling the compressing performance of the compressor 1, and means for controlling the throttle degree of the throttle apparatus 3 comprising an expansion valve for example. The refrigeration cycle control means 18 of the second embodiment may control the cooling quantity control means 9 including refrigeration cycle control means 18 of later-described third to fifth embodiments.

The operation of the drying apparatus will be explained.

Figure 4:
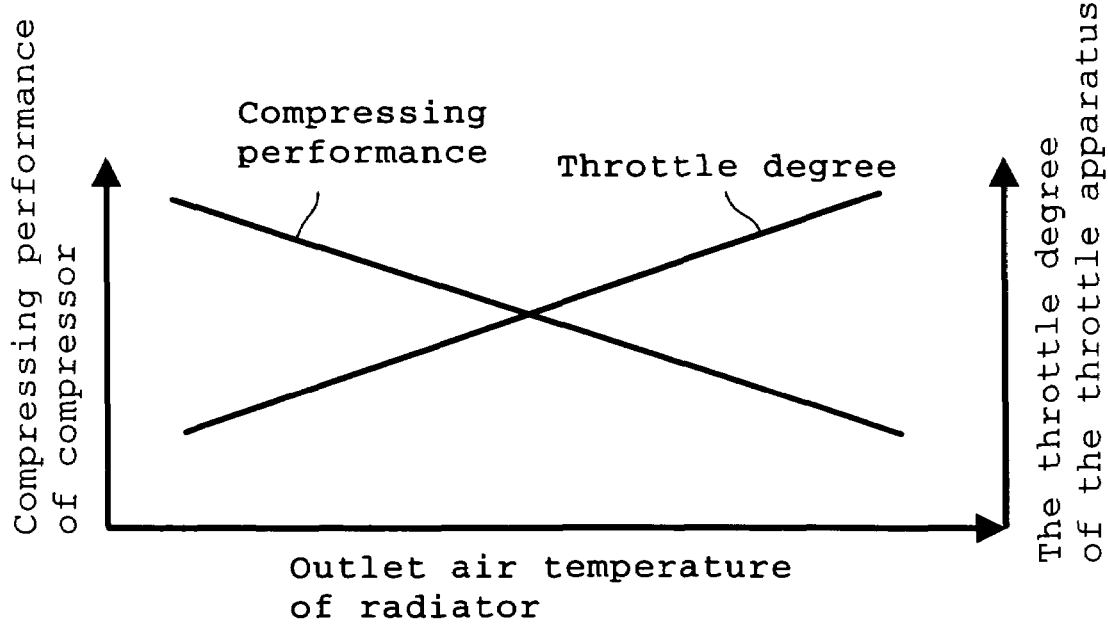
FIG. 4 shows relations between an outlet air temperature of a radiator and throttle degree of a throttle apparatus and between an outlet air temperature of a radiator and a compressing performance according to the second embodiment.
Figure 5:
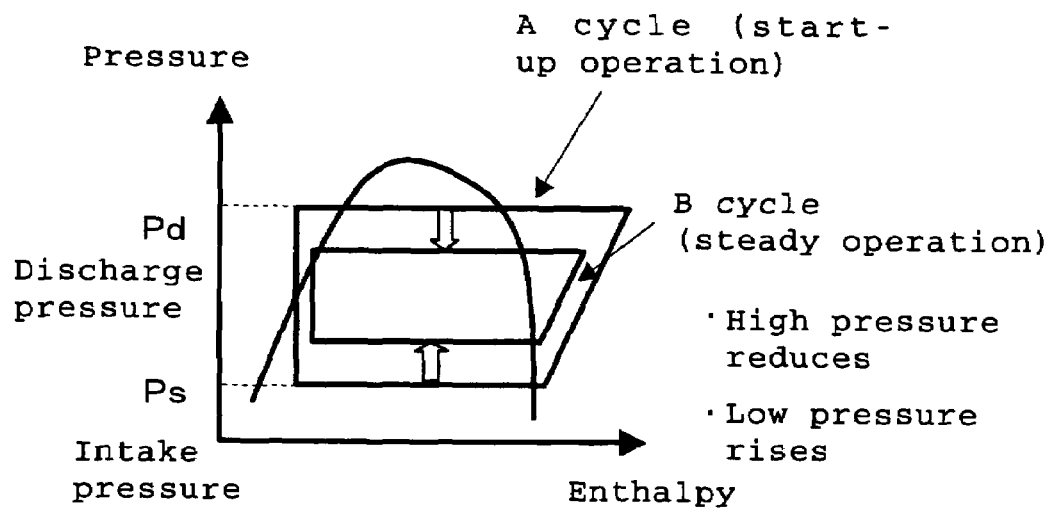
FIG. 5 is a Mollier diagram showing a refrigeration cycle of the second embodiment.

FIG. 4 shows relations between the outlet air temperature of the radiator 2 and the throttle degree of the throttle apparatus 3 and between the outlet air temperature of the radiator 2 and the compressing performance (e.g., operating frequency) of the compressor 1, and FIG. 5 is a Mollier diagram of a refrigeration cycle for explaining the operation of the drying apparatus of the second embodiment.

Since the outlet air temperature of the radiator 2 immediately after the operation of the heat pump apparatus is started is low, control is exercised such that the throttle degree of the throttle apparatus 3 is reduced, and the operating frequency of the compressor 1 is increased With this, the heat exchange amount of the radiator 2 can be increased and thus, the outlet air temperature of the radiator 2 can be increased more rapidly. The refrigerant temperature of the evaporator 4 is reduced by reducing the throttle degree of the throttle apparatus 3. Therefore, the amount of moisture to be absorbed can be increased and the drying time can be shortened. Control is exercised such that the throttle degree of the throttle apparatus 3 is increased and the operating frequency of the compressor 1 is reduced, as predetermined time is elapsed after the start of the operation and as the outlet air temperature of the radiator 2 is increased. That is, when the outlet temperature of the radiator 2 is high, the throttle degree of the throttle apparatus 3 is increased such that the heat exchange amount given to the radiator 2 is reduced, and the operating frequency of the compressor 1 is reduced. With this configuration, the refrigeration cycle can be shifted to a refrigeration cycle in which a compression ratio is small, safety is high and COP (coefficient of performance) is high, as in a case shown in FIG. 5 in which A cycle is shifted to B cycle.

By controlling the throttle degree of the throttle apparatus 3 and the operating frequency of the compressor 1 in accordance with the outlet air temperature of the radiator 2 in this manner, the rising speed of the outlet temperature of the radiator 2, i.e., the dry air temperature, immediately after the start of the operation is increased, and as the outlet air temperature is increased, the compression ratio of the refrigeration cycle is reduced. With this configuration, power required for the compressor 1 can be reduced, and energy can be saved.

Although the compressor 1 and the throttle apparatus 3 are controlled with variation in outlet air temperature of the radiator 2 in the above explanation, they may be controlled in a stepwise manner, or control may be exercised such that the compressing performance of the compressor 1 is increased and the throttle degree of the throttle apparatus 3 is reduced until the outlet air temperature of the radiator 2 reaches a first predetermined temperature, and the compressing performance of the compressor 1 is reduced and the throttle degree of the throttle apparatus 3 is increased after the outlet air temperature of the radiator 2 exceeds a second predetermined temperature.

(Third Embodiment)

Figure 6:
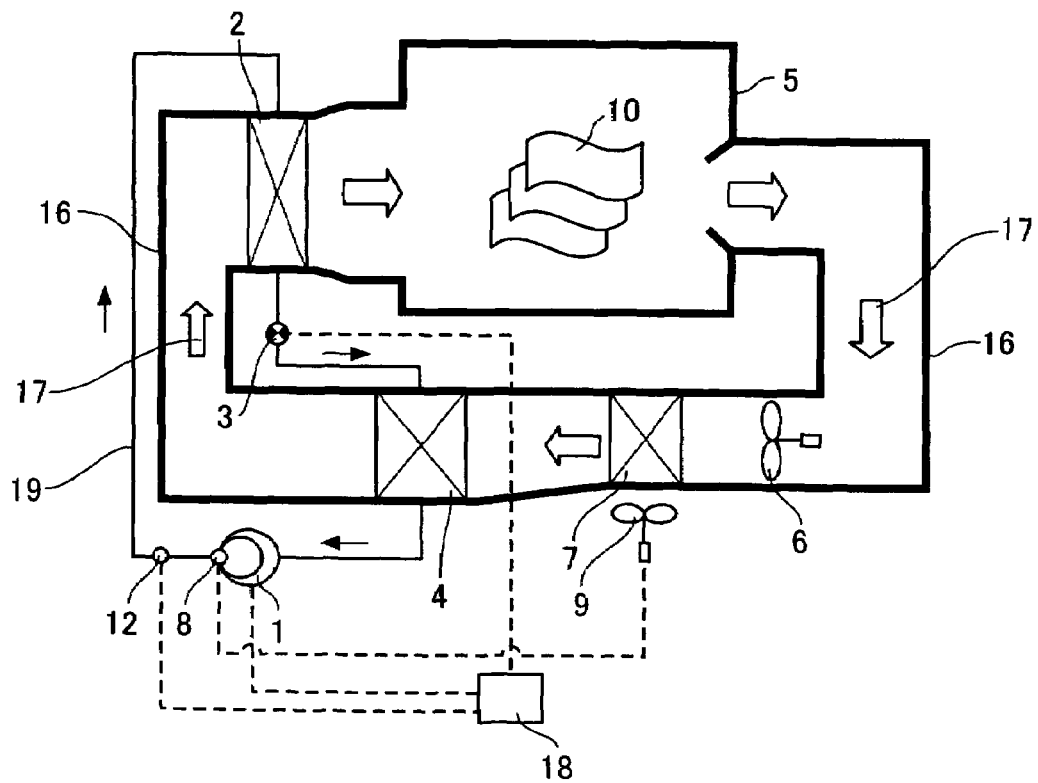
FIG. 6 is a block diagram showing a drying apparatus of a third embodiment of the invention.
Figure 7:
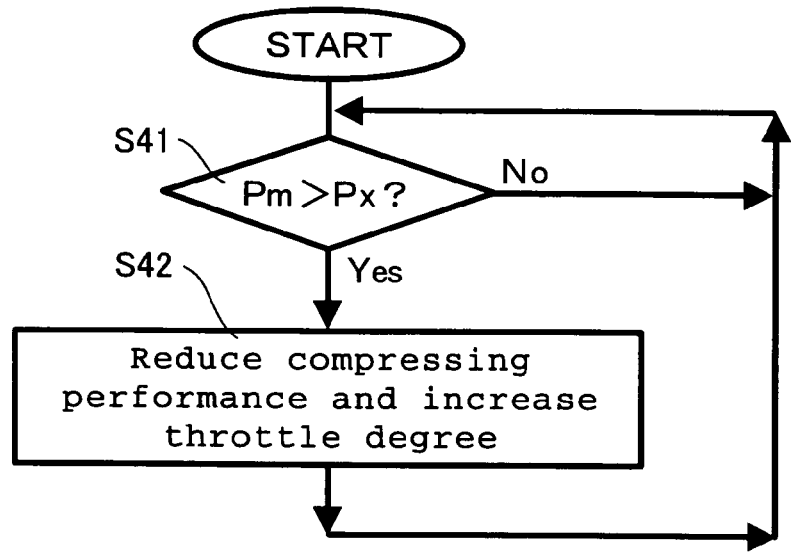
FIG. 7 is a control flowchart of a drying apparatus of a third embodiment.

FIG. 6 is a block diagram showing a drying apparatus of a third embodiment of the invention, and FIG. 7 is a control flowchart of the drying apparatus of the third embodiment.

The drying apparatus of the third embodiment includes discharge pressure detecting means 12 for detecting discharge pressure of the compressor 1, and refrigeration cycle control means 18 for controlling the compressing performance of the compressor 1 and the throttle degree of the throttle apparatus 3 based on the detected discharge pressure.

The operation of the drying apparatus will be explained below.

As shown in FIG. 7, in step 41, the refrigeration cycle control means 18 compares discharge pressure Pm detected by the discharge pressure detecting means 12 and target upper limit set pressure Px (e.g., 12 MPa) with each other. If Pm is greater than Px, it is determined that the discharge pressure exceeds a reliability reference value of the compressor, the procedure is proceeded to step 42, where control is exercised such that the compressing performance of the compressor 1 is reduced and the throttle degree of the throttle apparatus 3 is increased. Then, the procedure is returned to step 41. With this, it is possible to swiftly and largely reduce the discharge pressure. If Pm is equal to or smaller than Px, the procedure is returned to step 41.

In the drying apparatus of the third embodiment, the discharge pressure of the compressor 1 is detected, and the compressing performance of the compressor 1 and the throttle degree of the throttle apparatus 3 are controlled based on the detected discharge pressure. With this, it becomes possible to directly control the discharge pressure itself, and the discharge pressure can swiftly be adjusted. Thus, it is possible to swiftly and reliably solve the problem of the abnormal rise of the discharge pressure, and reliability of the compressor and the drying apparatus can be enhanced.

If the drying apparatuses of the third and second embodiments are combined, the dry air temperature immediately after the operation is started can swiftly be increased, the discharge pressure can swiftly and reliably be returned to the original pressure, and the drying apparatus can safely be operated.

(Fourth Embodiment)

Figure 8:
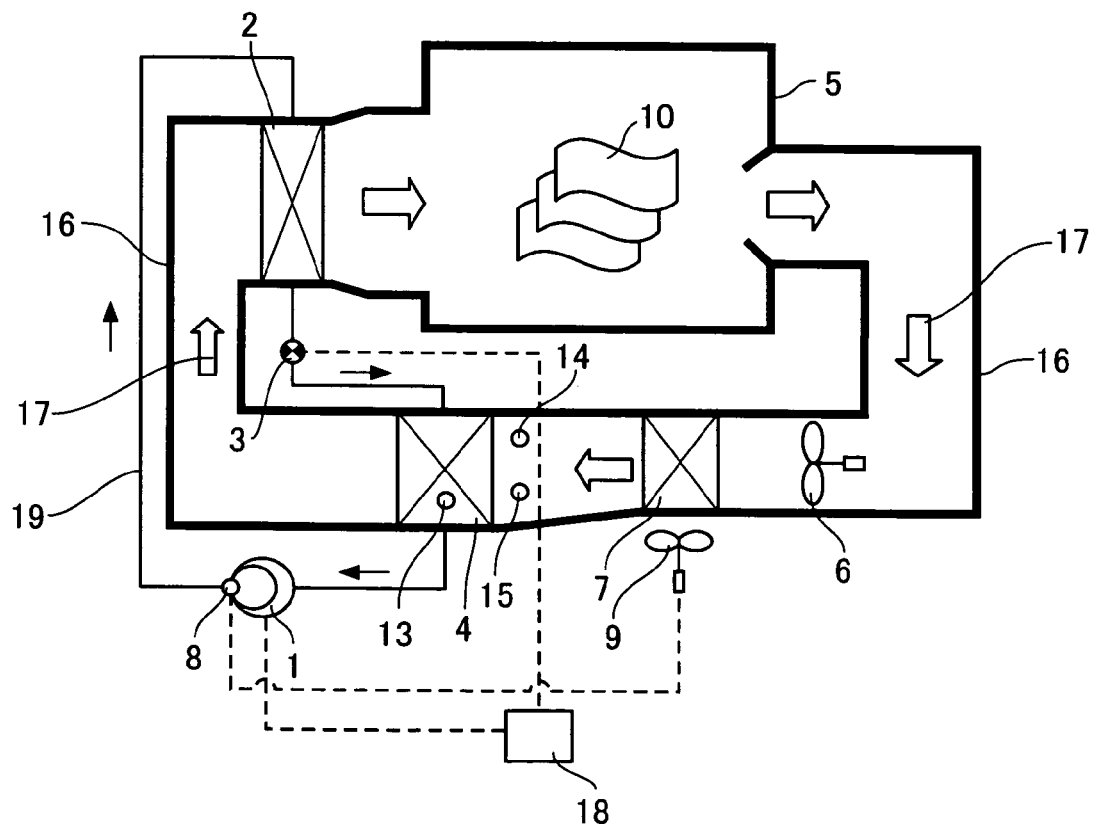
FIG. 8 is a block diagram showing a drying apparatus of a fourth embodiment of the invention.
Figure 9:
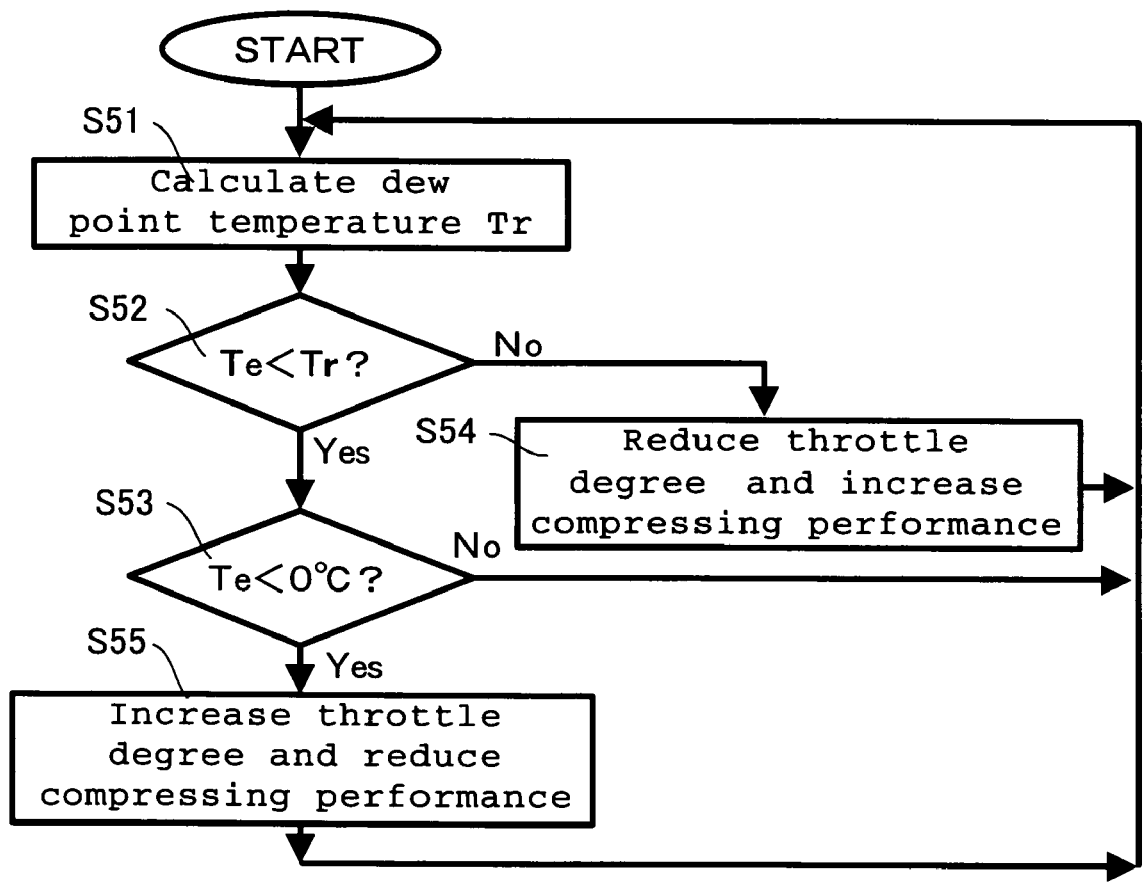
FIG. 9 is a control flowchart of the drying apparatus of the fourth embodiment.

FIG. 8 is a block diagram showing a drying apparatus of a fourth embodiment of the invention, and FIG. 9 is a control flowchart of the drying apparatus of the fourth embodiment.

The drying apparatus of the fourth embodiment includes evaporator temperature detecting means 13 for detecting the refrigerant temperature of the evaporator 4, inlet air temperature detecting means 14 for detecting the inlet air temperature of the evaporator 4, inlet air humidity detecting means 15 for detecting the inlet air humidity of the evaporator 4, and refrigeration cycle control means 18 for controlling the compressing performance of the compressor 1 and the throttle degree of the throttle apparatus 3 based on the detected evaporator temperature and the dew point temperature.

The operation of the drying apparatus will be explained.

As shown in FIG. 9, in step 51, the refrigeration cycle control means 18 calculates the dew point temperature Tr (e.g., 2° C.) from the temperature detected by the inlet air temperature detecting means 14 and the humidity detected by the inlet air humidity detecting means 15. Then, the procedure is proceeded to step 52, where the evaporator temperature Te detected by the evaporator temperature detecting means 13 and the dew point temperature Tr are compared with each other.

If the Te is equal to or greater than Tr, it is determined that the evaporator 4 can not dehumidify, the procedure is proceeded to step 54, where control is exercised such that the throttle degree of the throttle apparatus 3 is reduced and the compressing performance of the compressor 1 is increased, and the procedure is returned to step 51. With this determination and control operation, since the refrigerant temperature at the evaporator 4 is reduced and becomes equal to or smaller than the dew point temperature, the dehumidification in the evaporator 4 can be carried out.

If Te is smaller than Tr in step 52, the procedure is proceeded to step 53, where the evaporator temperature Te and a frost formation set value (i.e., 0° C.) are compared with each other. If Te is equal to or greater than the set value, it is determined that frost is not formed in the evaporator 4, and the procedure is returned to step 51.

If Te is smaller than the set value in step 53, it is determined that there is a possibility that frost is formed in the evaporator 4, and the procedure is proceeded to step 55. Then, control is exercised such that the throttle degree of the throttle apparatus 3 is increased and the compressing performance of the compressor 1 is reduced, and the procedure is returned to step 51. With this determination and control operation, since the refrigerant temperature in the evaporator 4 is reduced and frost is prevented from being formed, it is possible to prevent the heat transfer coefficient in the evaporator 4 from being reduced and to prevent ventilation resistance from being increased.

In the drying apparatus of the fourth embodiment, the evaporator temperature of the evaporator 4 and the dew point temperature of inlet air of the evaporator 4 are detected, and the throttle degree of the throttle apparatus 3 and/or compressing performance of the compressor 1 is controlled. With this, the evaporator 4 is reliably dehumidified and frost can be prevented from being formed. Thus, it is possible to dry within shorter time, and to provide a drying apparatus having high reliability and efficiency, and to provide an operating method of the drying apparatus.

(Fifth Embodiment)

Figure 10:
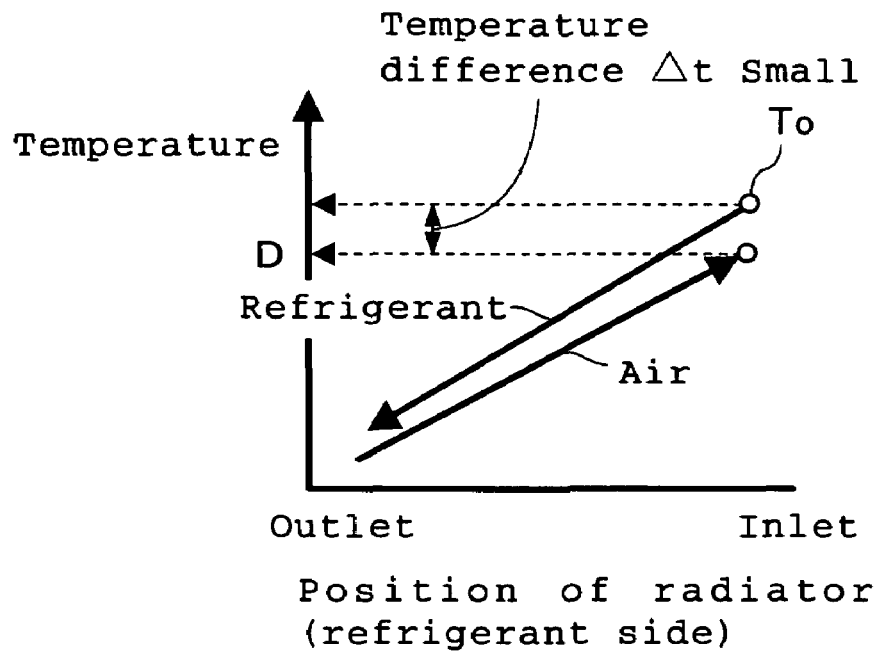
FIG. 10 shows temperature variations of air and a refrigerant in a radiator of a drying apparatus of a fifth embodiment according to the invention.
Figure 11:
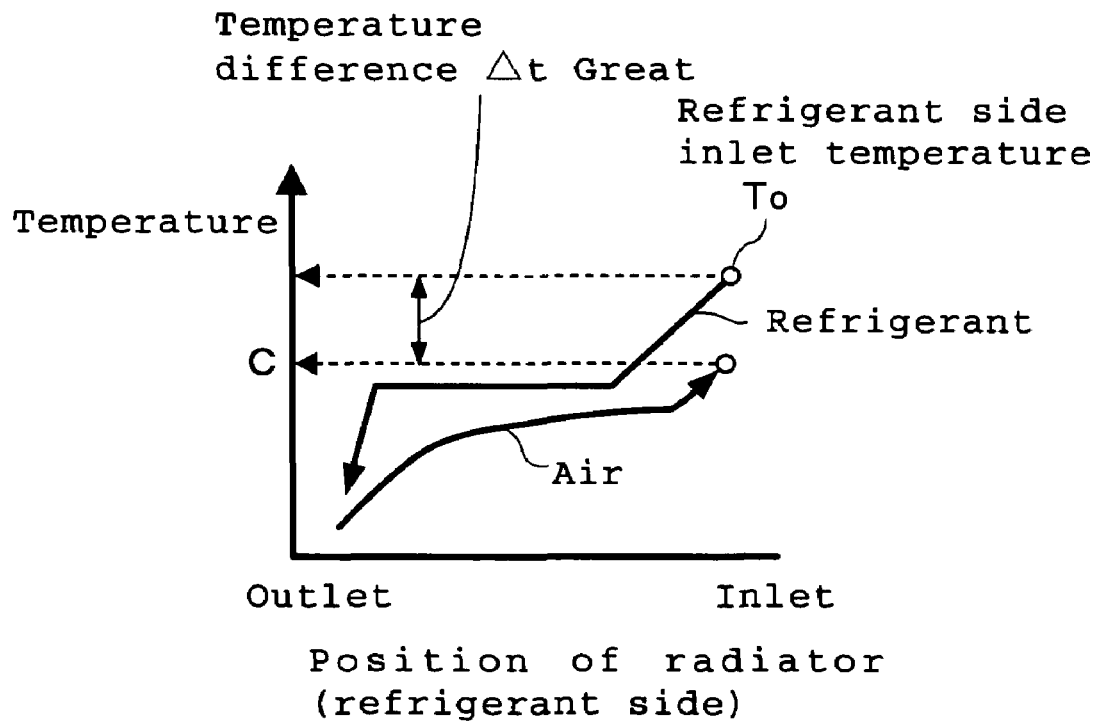
FIG. 11 shows temperature variation if air and a refrigerant in a radiator of a drying apparatus when a flon refrigerant is used.
Figure 12:
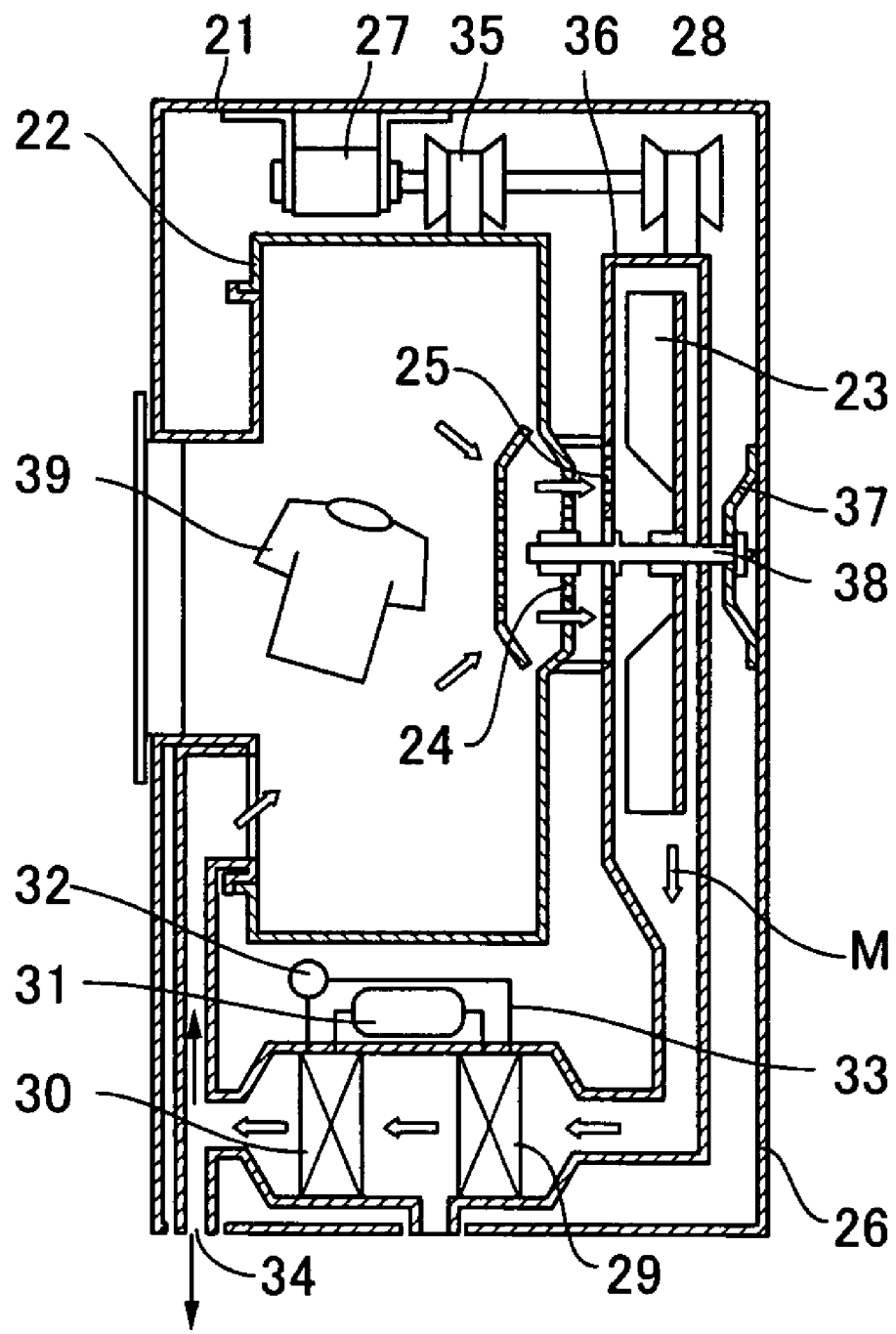
FIG. 12 is a block diagram of a conventional drying apparatus.

A drying apparatus of a fifth embodiment of the invention will be explained with reference to FIGS. 10 and 11. In the fifth embodiment, the heat pump apparatus of any of first to fourth embodiments is used, and carbon dioxide is used as the refrigerant. The radiator of the drying apparatus of the fifth embodiment is operated in a state in which its high pressure side pressure exceeds the critical pressure. FIG. 10 schematically shows variations of temperatures of refrigerant and air in the radiator of the drying apparatus. FIG. 11 schematically shows variation of temperatures of refrigerant and air in the radiator 2 when flon refrigerant is used.

That is, as shown in FIG. 11, in the case of flon refrigerant, the refrigerant is brought from a superheat state into a gas-liquid two phase state in the radiator 2, and the state is changed into a supercool state, the refrigerant heat-exchanges with air, and the air side outlet temperature in the radiator 2 rises to C.

On the other hand, as shown in FIG. 10, when carbon dioxide is used as a refrigerant and the apparatus is operated in a state in which the high pressure side pressure exceeds the critical pressure, the heat exchange in the radiator 2 does not cause the gas-liquid phase change. Therefore, a temperature differences $\Delta t$ between the air side outlet temperature and the refrigerant side inlet temperature can be made smaller than a temperature difference $\Delta T$ in the case of the flon refrigerant, and the outlet air temperature of the radiator 2 becomes D. That is, if the refrigerant side inlet temperature To is the same temperature, the outlet air temperature D in the case of carbon dioxide refrigerant can be made higher than the outlet air temperature C in the case of the flon refrigerant.

In the drying apparatus of the fifth embodiment, if carbon dioxide is used in the heat pump apparatus as a refrigerant in which the heat exchange of the radiator 2 can be carried out in the supercritical state, the temperature of the drying air 17 can further be increased. Therefore, it is possible to further shorten the drying time, and to provide a drying apparatus having high drying efficiency.

Although the drying apparatus for drying clothing is described in the embodiments, the drying apparatus can also be used for drying plateware, garbage and the like.

As apparent from the above description, according to the drying apparatus of the present invention, the amount of heat to be discharged out can always be adjusted by detecting the input of the compressor and controlling the cooling quantity of the cooling apparatus. Therefore, it is possible to further shorten the drying time and to save energy while carrying out stable refrigeration cycle operation from the beginning of operation.

Further, according to the drying apparatus of the invention, the compressing performance of the compressor and the throttle degree of the throttle apparatus are controlled in accordance with the outlet air temperature of the radiator. With this, the rising speed of the radiator outlet temperature of the radiator, i.e., the drying air temperature, immediately after the start of the operation is increased, and as the outlet air temperature is increased, the compression ratio of the refrigeration cycle is reduced. With this configuration, power required for the compressor can be reduced and energy can be saved.

According to the drying apparatus of the invention, the discharge pressure of the compressor is detected, and the compressing performance of the compressor and the throttle degree of the throttle apparatus are controlled. With this, the discharge pressure can swiftly be controlled. Therefore, it is possible to more reliably secure the reliability of the compressor and the drying apparatus, and the drying air temperature immediately after the drying operation is started can swiftly be increased.

The refrigerant temperature of the evaporator, as well as the inlet air temperature and the inlet air humidity of the evaporator are detected, and the compressing performance of the compressor and the throttle degree of the throttle apparatus are controlled. With this, the dehumidification in the evaporator can reliably be carried out, and frost can be prevented from being formed and thus, the drying operation can be carried out within shorter time, and the drying apparatus can reliably be operated efficiently.

In the high side pressure, since the heat pump apparatus is operated under the supercritical pressure, the drying air temperature can further be increased. Thus, the drying time can be shortened, and the drying apparatus can be operated efficiently.

INDUSTRIAL APPLICABILITY

According to the present invention, as described above, the drying apparatus can be used not only for drying clothing, but also for drying plateware, garbage and the like.

The invention claimed is:

1. A drying apparatus comprising:
   a heat pump apparatus in which a radiator and an evaporator of the heat pump apparatus are located inside an air circulation path of the drying apparatus;
   the heat pump apparatus contains a refrigerant which circulates through a compressor which is connected in line with the radiator which is connected in line with a throttle apparatus which is connected in line with the evaporator, in this order; and
   the air circulation path, being a closed loop without air exchange between and an inside and an outside of the air circulation path, contains air which is heated by said radiator before being introduced into a dry chamber, the air coming out from said dry chamber is cooled by heat exchanging with air outside of the air circulation path by a cooling apparatus downstream from the dry chamber, the air cooled by said cooling apparatus is dehumidified by said evaporator of the heat pump apparatus, the evaporator being located downstream from the cooling apparatus, and the air dehumidified by said evaporator is recirculated via the air circulation path to the radiator and is again heated by said radiator,
   with the compressor being connected to a compressor input detecting means for detecting input of said compressor, and the cooling apparatus being connected to a cooling quantity control means for controlling a cooling quantity of said cooling apparatus using a value detected by said compressor input detecting means.

2. The drying apparatus according to claim 1, further comprising
   outlet air temperature detecting means for detecting outlet air temperature of said radiator, and
   refrigeration cycle control means for controlling compressing performance of said compressor using a value detected by said outlet air temperature detecting means.

3. The drying apparatus according to claim 2, wherein said refrigeration cycle control means controls throttle degree of said throttle apparatus using a value detected by said outlet air temperature detecting means.

4. The drying apparatus according to claim 1, further comprising
   discharge pressure detecting means for detecting discharge pressure of said compressor, and
   refrigeration cycle control means for controlling compressing performance of said compressor using a value detected by said discharge pressure detecting means.

5. The drying apparatus according to claim 4, wherein said refrigeration cycle control means controls the throttle degree of said throttle apparatus using a value detected by said discharge pressure detecting means.

6. The drying apparatus according to claim 1, further comprising
   evaporator temperature detecting means for detecting refrigerant temperature of said evaporator,
   inlet air temperature detecting means for detecting inlet air temperature of said evaporator,
   inlet air humidity detecting means for detecting inlet air humidity of said evaporator, and
   refrigeration cycle control means for controlling compressing performance of said compressor based on dew point temperature determined by a value detected by said inlet air temperature detecting means and a value detected by said inlet air humidity detecting means.

7. The drying apparatus according to claim 6, wherein said refrigeration cycle control means controls the throttle degree of said throttle apparatus based on dew point temperature determined by a value detected by said inlet air temperature detecting means and a value detected by said inlet air humidity detecting means.

8. An operating method of a drying apparatus comprising:
   providing a heat pump apparatus in which a radiator and an evaporator of the heat pump apparatus are located inside an air circulation path of the drying apparatus;

providing the air circulation path;

circulating a refrigerant through the heat pump apparatus having a compressor which is connected in line with the radiator which is connected in line with a throttle apparatus which is connected in line with the evaporator, in this order;

circulating air through the air circulation path in which air is heated by said radiator before being introduced into a dry chamber, the air coming out from said dry chamber is cooled by heat exchanging with air outside of the air circulation path by a cooling apparatus downstream from the dry chamber, the air cooled by said cooling apparatus is dehumidified by said evaporator of the heat pump apparatus, the evaporator being located downstream from the cooling apparatus, and the air dehumidified by said evaporator is recirculated via the air circulation path to the radiator and is again heated by said radiator;

increasing the cooling quantity of said cooling apparatus if an input power of said compressor is increased; and decreasing the cooling quantity of said cooling apparatus if the input power of said compressor is reduced.

9. An operating method of a drying apparatus comprising providing a heat pump apparatus in which a radiator and an evaporator of the heat pump apparatus are located inside an air circulation path of the drying apparatus;

providing the air circulation path;

circulating a refrigerant through the heat pump apparatus having a compressor which is connected in line with the radiator which is connected in line with a throttle apparatus which is connected in line with the evaporator, in this order;

circulating air through the air circulation path in which air is heated by said radiator before being introduced into a dry chamber, the air coming out from said dry chamber is cooled by heat exchanging with air outside of the air circulation path by a cooling apparatus downstream from the dry chamber, the air cooled by said cooling apparatus is dehumidified by said evaporator of the heat pump apparatus, the evaporator being located downstream from the cooling apparatus, and the air dehumidified by said evaporator is recirculated via the air circulation path to the radiator and is again heated by said radiator;

reducing compressor performance if outlet air temperature of said radiator exceeds a predetermined temperature; and increasing compressor performance if the outlet air temperature of said radiator becomes equal to or smaller than the predetermined temperature.

10. The operating method of the drying apparatus according to claim 9, wherein if the outlet air temperature of said radiator exceeds the predetermined temperature, throttle degree of said throttle apparatus is allowed to be increased, and if the outlet air temperature of said radiator becomes equal to or smaller than the predetermined temperature, the throttle degree of the throttle apparatus is allowed to be reduced.

11. An operating method of a drying apparatus comprising:

providing a heat pump apparatus in which a radiator and an evaporator of the heat pump apparatus are located inside an air circulation path of the drying apparatus;

providing the air circulation path;

circulating a refrigerant through the a heat pump apparatus having a compressor which is connected in line with the radiator which is connected in line with a throttle apparatus which is connected in line with the evaporator, in this order;

providing an evaporator temperature detecting means for detecting refrigerant temperature of said evaporator;

providing an inlet air temperature detecting means for detecting inlet air temperature of said evaporator; and providing an inlet air humidity detecting means for detecting inlet air humidity of said evaporator;

circulating air through the air circulation path in which air is heated by said radiator before being introduced into a dry chamber, the air coming out from said dry chamber is cooled by heat exchanging with air outside of the air circulation path by a cooling apparatus downstream from the dry chamber, the air cooled by said cooling apparatus is dehumidified by said evaporator of the heat pump apparatus, the evaporator being located downstream from the cooling apparatus, and the air dehumidified by said evaporator is recirculated via the air circulation path to the radiator and is again heated by said radiator;

calculating dew point temperature by using a value detected by said inlet air temperature detecting means and a value detected by said inlet air humidity detecting means, comparing the calculated dew point temperature and refrigerant temperature detected by said evaporator temperature detecting means with each other, and increasing compressor performance if the detected refrigerant temperature is higher than the dew point temperature, and reducing compressor performance if the detected refrigerant temperature is lower than a predetermined temperature.

12. The operating method of the drying apparatus according to claim 11, wherein if the detected refrigerant temperature is higher than the dew point temperature, the throttle degree of the throttle apparatus is allowed to be reduced, and if the detected refrigerant temperature is lower than a predetermined temperature, the throttle degree of the throttle apparatus is allowed to be increased.

13. The operating method of the drying apparatus according to any one of claims 8 to 12, wherein if discharge pressure of said compressor exceeds predetermined pressure, the compressing performance of said compressor is allowed to be reduced.

14. The operating method of the drying apparatus according to claim 13, wherein if the discharge pressure of said compressor exceeds a predetermined pressure, the throttle degree of said throttle apparatus is allowed to be increased.

15. The drying apparatus according to any one of claims 1 to 7, wherein carbon dioxide is used as the refrigerant, and the drying apparatus is operated in a state in which high pressure side pressure exceeds critical pressure.

16. The operating method of the drying apparatus according to any one of claims 8 to 12, wherein carbon dioxide is used as the refrigerant, and the drying apparatus is operated in a state in which high pressure side pressure exceeds critical pressure.

* * * * *